(12) United States Patent
Aoyama

(10) Patent No.: US 7,285,938 B2
(45) Date of Patent: Oct. 23, 2007

(54) APPARATUS FOR CONTROLLING ON-VEHICLE GENERATOR

(75) Inventor: Toru Aoyama, Okazaki (JP)

(73) Assignee: Denso Corporation, Kariya (JP)

( * ) Notice: Subject to any disclaimer, the term of this patent is extended or adjusted under 35 U.S.C. 154(b) by 233 days.

(21) Appl. No.: 11/174,651

(22) Filed: Jul. 6, 2005

(65) Prior Publication Data

US 2006/0006845 A1    Jan. 12, 2006

(30) Foreign Application Priority Data

Jul. 6, 2004    (JP)    ............................ 2004-198956
Jun. 3, 2005   (JP)    ............................ 2005-163491

(51) Int. Cl.
*H02J 7/14*    (2006.01)

(52) U.S. Cl. .......................... 322/28; 322/36

(58) Field of Classification Search .................. 322/25, 322/28, 36, 37, 45, 99

See application file for complete search history.

(56) References Cited

U.S. PATENT DOCUMENTS

| 4,651,081 | A | * | 3/1987 | Nishimura et al. | 320/123 |
| 5,491,400 | A | * | 2/1996 | Iwatani et al. | 322/28 |
| 5,581,172 | A | * | 12/1996 | Iwatani et al. | 322/28 |
| 5,629,606 | A | * | 5/1997 | Asada | 322/28 |
| 6,424,127 | B1 | * | 7/2002 | Ishii | 322/36 |
| 6,486,638 | B1 | * | 11/2002 | Sumimoto et al. | 322/28 |
| 6,700,355 | B2 | * | 3/2004 | Aoyama et al. | 322/36 |
| 2006/0181248 | A1 | * | 8/2006 | Aoyama | 322/28 |

FOREIGN PATENT DOCUMENTS

| JP | A 05-176599 | 7/1993 |
| JP | A 2002-325085 | 11/2002 |

* cited by examiner

*Primary Examiner*—Nicholas Ponomarenko
(74) *Attorney, Agent, or Firm*—Oliff & Berridge, PLC

(57) ABSTRACT

A generation controller controls an amount of power generated by an on-vehicle generator responsively to a command signal from an external controller. The generation controller comprises detection, determination, and output control units. The detection unit detects a revolution number of the generator. The determination unit determines whether or not the revolution number of the generator is over a reference revolution number. The output control it controls a generator output based on a first target value decided corresponding to a command value indicated by the command signal, when the revolution number of the generator is less than the reference revolution number, and controls the generator output based on a second target value in place of the first target value. The second target value is set internally within the generation controller, when the revolution number of the generator is over or equal to the reference revolution number.

20 Claims, 3 Drawing Sheets

APPARATUS FOR CONTROLLING ON-VEHICLE GENERATOR

CROSS REFERENCES TO RELATED APPLICATIONS

The present application relates to and incorporates by reference Japanese Patent application Nos. 2004-198956 filed on Jul. 6, 2004 and 2005-163491 filed on Jun. 3, 2005.

BACKGROUND OF THE INVENTION

1. Field of the Invention

The present invention relates to an apparatus for controlling power generated by a generator mounted in a vehicle, such as passenger vehicle and commercial vehicle.

2. Description of the Related Art

A conventional generator mounted on a vehicle is accompanied by a generation controller, which controls the generation activities of the generator.

Such a generation controller is shown; for instance, by Japanese Patent Laid-open Publication No. 2002-325085. This publication exemplifies a generation controller which operates in response to a command from an ECU (electrical control unit) disposed outside the generator. Specifically, when the generation controller fails in reception of a command signal from the ECU or does not receive a command signal over a plurality of intervals in succession or during a predetermined period of time continuously, the generation controller takes an action against such failures. That is, when such failures occur, the generation controller operates such that a characteristic value set based on the received command signal is forcibly set to a default value. Using this generation controller, it is possible to control the on-vehicle generator in its normal conditions, even when some accidents are caused on the command signals transmitted and received to and from the ECU via a communication line.

However, the default-use countermeasure taken by the above generation controller is still insufficient for an occasion where the values themselves of the commands from the ECU are erroneous. For instance, a calculator, memory, or external sensors included in an ECU to calculate an optimum voltage of power to be generated may be in failure. If such a case occurs, an erroneous command consisting of information codes different from a desired command value is produced and transmitted to the generation controller. Thus an on-vehicle generator is obliged to undergo control based on the erroneous command. One example is that an erroneous command is "a command for generation of zero-volt power." If information codes indicative of such an erroneous command are transmitted, the generation controller is forced to stop its generation and to hold its non-generated state, which will cause a lack in charging an on-vehicle battery during a vehicle's running state. Hence there is a possibility that various devices electrically connected to the battery are obliged to stop their activities.

SUMMARY OF THE INVENTION

The present invention has been completed with the above view in mind and has an object to provide a generation controller capable of sustaining an on-vehicle generator generating power, even when the generator receives erroneous command values for the generation from the outside of the generator.

To achieve the above object, as one mode, the present invention provides a generation controller for controlling an amount of power generated by an on-vehicle generator in response to a command signal transmitted from an external controller placed outside the generator, the generation controller comprising a detection unit detecting a revolution number of the generator; a determination unit determining whether or not the revolution number of the generator is over a reference revolution number; and an output control unit controlling an output of the generator based on a first target value decided corresponding to a command value indicated by the command signal, in cases where the revolution number of the generator is less than the reference revolution number, and controlling the output of the generator based on a second target value in place of the first target value, the second target value being set internally within the generation controller, in cases where the revolution number of the generator is over or equal to the reference revolution number.

Thus, when the number of revolutions of the generator becomes higher than the predetermined reference revolution number, the second target value, which is set internally, is used for keeping the generation, in place of the first target value coming from the external controller. Therefore, even when a command value indicated by the command signal from the external controller is erroneous, the first target made from the command value (i.e., the command signal) is removed from the control, as long as the revolution number of the generator is higher than the predetermined reference revolution number. This prevents severe deteriorations in the performances of a battery and electronic loads connected to the generator.

As a second mode, the present invention provides a generation controller for controlling an amount of power generated by an on-vehicle generator in response to a command signal from an external controller placed outside the generator, the generation controller comprising: a detection unit detecting a revolution number of the generator; a determination unit determining whether or not the revolution number of the generator is within a predetermined range of revolution numbers, and an output control unit controlling an output of the generator based on a fast target value decided corresponding to a command value indicated by the command signal, in cases where the revolution number of the generator is within the predetermined range of revolution numbers and controlling the output of the generator based on a second target value in place of the first target value, the second target value being set internally within the generation controller, in cases where the revolution number of the generator is outside the predetermined range of revolution numbers.

Preferably, the second target value is a value substantially equal to a voltage charging a battery connected to the generator.

Hence, when the number of revolutions of the generator is within the predetermined range, the generation control based on the first target value from the external controller is permitted. In contrast, the revolution number is outside the predetermined range, the generation control based on the first target value is prohibited. Instead, the second target value produced within the generator in order to charge the battery is used to control the generation. Therefore, in the predetermined range of revolutions, the generation control can be done depending on the command signal (command value) from the external controller. By contrast, in cases where the generator is driven to have a rotation number which is less than the predetermined range of revolutions (that is, the rotation for starting the engine), the voltage charging the battery can be used to make an initial exciting current flowing through an exciting winding. The rotation of the generator itself makes it possible to easily start the generation. Additionally, when the generator is driven to have a rotation number which is higher than the predetermined range of revolutions (that is, the rotation during the running of a vehicle), the generation control can be switched to the control based on the voltage charging the battery, which is carried out automatically depending on rotated conditions of the generator itself. As a result, like the foregoing, severe deteriorations in the performances of a battery and electronic loads connected to the generator are prevented.

In this configuration, preferably, wherein the determination unit comprises a first determination circuit determining a difference between a lower limit of the predetermined range of revolution numbers and the revolution number of the generator using an amplitude of a phase voltage induced across an armature winding of the generator, wherein the first determination circuit comprises a detection circuit detecting, as the amplitude, a peak value of the phase voltage, and a first voltage comparator determining whether or not the peak value is lower than a first reference voltage lower than the voltage charging the battery, and producing, a switching signal for commanding the control of the output of the generator carried out based on the second target value, in cases where it is determined that the peak value is lower than the first reference voltage, and for commanding the control of the output of the generator carried out based on the first target value, in cases where it is determined that the peak value is higher than or equal to the first reference voltage.

In this configuration, it is still preferred that the determination unit comprises a second determination circuit determining a difference between an upper limit of the predetermined range of revolution numbers and the revolution number of the generator on the basis of a frequency of the phase voltage, wherein the second determination circuit comprises a second voltage comparator making a comparison between the phase voltage and a second reference voltage designated as an amount less than the first reference voltage; and a frequency comparator determining, based on compared results at the second voltage comparator, whether or not the frequency of the phase voltage is smaller than a reference frequency, and producing the switching signal for commanding the control of the output of the generator carried out based on the first target value, in cases where it is determined that the frequency of the phase voltage is lower than the reference frequency, and for commanding the control of the output of the generator carried out based on the second target value, in cases where it is determined that the frequency of the phase voltage is higher than or equal to the reference frequency.

DETAILED DESCRIPTION OF PREFERRED EMBODIMENTS

Various embodiments of a generation controller according to the present invention will now be described below in detail with reference to the accompanying drawings.

First Embodiment

Figure 1:
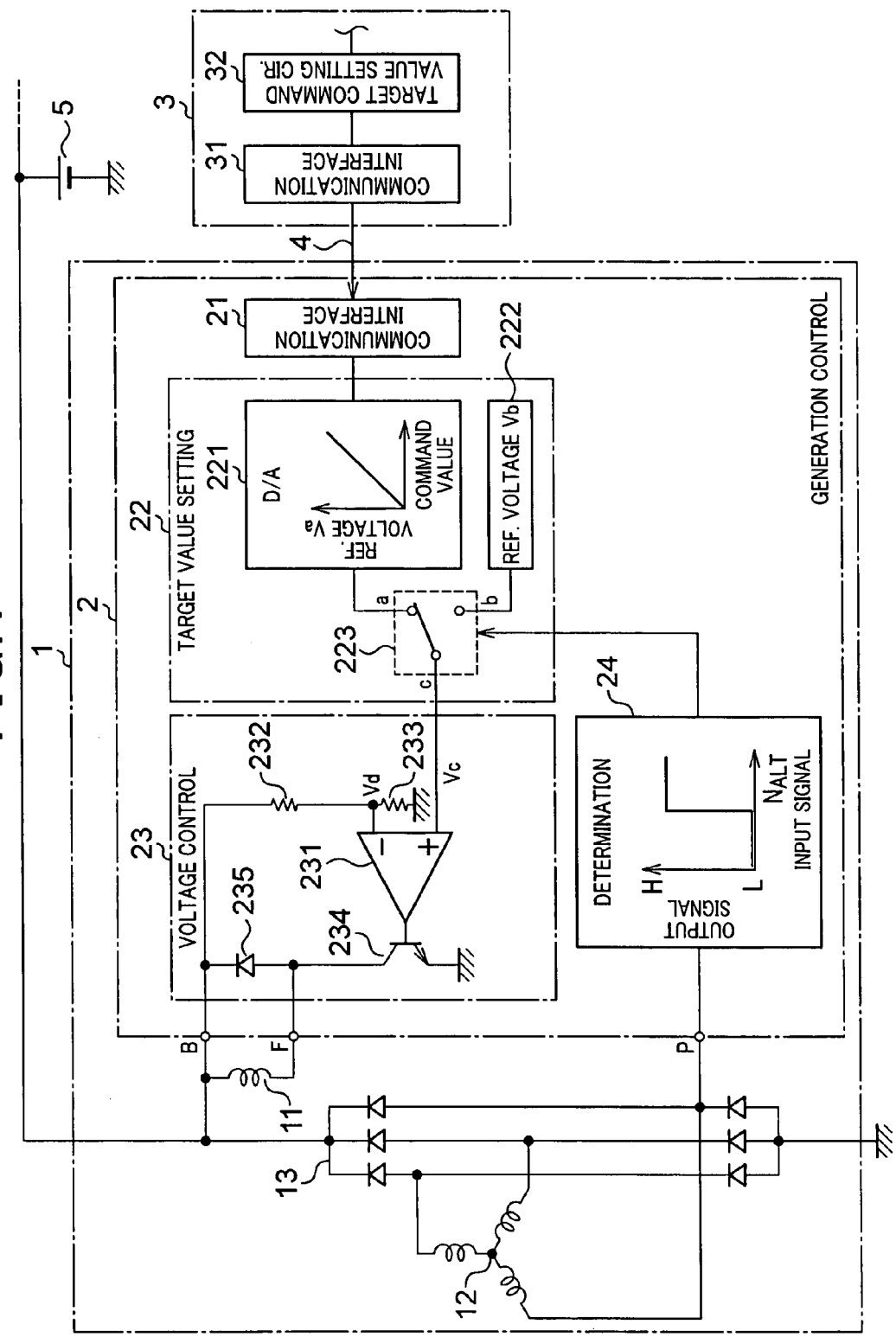
FIG. 1 is an electrical block diagram showing an on-vehicle generator including a generation controller according to a first embodiment of the present invention.

Referring to FIG. 1, a first embodiment of the generation controller will now be described.

FIG. 1 shows an overall configuration of an on-vehicle generator 1 (e.g., alternator) connected to various on-vehicle devices, such as battery and an external controller. As shown in FIG. 1, there are provided, in addition to a generation controller 2, an excitation winding 11, armature windings 12, and rectifier circuit 13 including rectifiers composing a full-wave rectifier.

The exciting winding 11, which generates a magnetic field responsively to supplied current, provides a rotator together with a magnetic field pole (not shown) around which the winding 11 is turned. In contrast, the armature windings 12 are composed of multi-phase windings (e.g., three-phase windings) and provides an armature together with the windings 12 is wound around an armature core. These armature windings 12 respond to changes in the magnetic field generated by the exciting winding 11 so as to yield magnetomotive forces. Alternating-current (AC) outputs induced along the armature windings 12 are supplied to the rectifier circuit 13, at which the AC outputs are subjected to full-wave rectification. The output from the rectifier circuit 13 becomes an output of the on-vehicle generator 1 (hereinafter, simply called "generator") which is provided to various loads including a battery 5 and not-shown electrical loads. The output of the generator 1 varies depending on the number or revolutions (the revolution number) of the rotor and an amount of exciting current flowing through the exciting winding 11. The exciting current is controlled by the generation controller 2.

The external controller 3 is eclectically connected with the generator 1. This external controller 3 is configured to control the output of the generator 1 from the outside thereof. In order for this control, the external controller 3 is provided with a target command value setting unit 32 and a communication interface 31. Of these, the setting unit 32 draws a comparison between characteristic values, such as the number of revolutions of an engine, vehicle running states, battery charge voltage, and electrical load conditions, which are detected using a variety of sensors, and preset reference values for the characteristic values, and then outputs a target command value for the generator 1 on the basis of the compared results. The target command value is a value of voltage to be regulated (a regulation voltage value), but this is a decisive one. An is exciting current value or a duty ratio for switching-controlling the exciting current may be employed as the target command value.

A communication line 4 connects the external controller 3 and the generator 1, so that information codes indicative of a target command value are sent from the controller 3 to the generator 1 via the communication interface and communication line 4.

The generation controller 2 is provided with a communication interface 21, a target value setting circuit 22, a voltage control circuit 23, and a determination circuit 24.

Of these, the communication interface 21 receives, at the generation controller 2, the information codes transmitted from the external controller 3 as a command for a target value corresponding to the information codes. That is, the information codes provide a coded target cored value. In addition, the communication interface 21 responds to a request from the external controller 3 by transmitting information codes produced in the generation controller 2. For example, the information codes to be produced are information indicating a generation rate and warning information informing operators that a malfunction has been caused in the charge system or not.

The target value setting circuit 22 is provided with a digital to analog (D/A) converter 221, reference voltage generator 222, and switching circuit 223.

The D/A converter 221 receives a command value (in the digital form) through the communication interface 21 and converts to the received command value to an analog form, which provides an analog-form reference voltage Va serving as a first command value providing a first target value. The reference voltage generator 222, which can be formed by a function generator or a CPU-based processor, generates a second reference voltage Vb serving as a second command value providing a second target value.

The switching circuit 223 has two input terminals "a" and "b" and one output terminal "c", in which the one input terminal "a" is connected to the D/A converter 221 and the other input terminal "b" is connected to the reference voltage generator 222, respectively. This switching circuit 223 is configured to select either one of an output voltage (reference voltage Va) of the D/A converter 221 or an output voltage (reference voltage Vb) of the reference voltage generator 222 so as to supply the selected reference voltage Va or Vb to the next voltage control circuit 23. The selected voltage Va or Vb is outputted from this switching circuit 223, namely, the target value setting circuit 22. This switching circuit 223 responds to a switching command signal from the determination circuit 24 in order to realize such selecting operations.

As shown in FIG. 1, the voltage control circuit 23 is provided with a voltage comparator 231, resistors 232 and 233, switching element 234, and flywheel diode 235.

Of these, the voltage comparator 231 has a non-inverting input terminal receiving a reference voltage Vc from the target value setting circuit 22 and an inverting input terminal reconvening a detected voltage Vd. An output voltage to the generator 1 is divided by a voltage dividing circuit consisting of the resistors 232 and 233, resulting in the production of the detected voltage Vd.

An output terminal of this voltage comparator 231 is connected to the switching element 234, which is provided with a power transistor. The power transistor has a base connected to an output terminal of the voltage comparator 231, a collector connected to an output terminal of the generator 2 via the flywheel diode 235, and an emitter grounded. Additionally, the collector is connected to the exciting winding 11 as well, with the result that turning on the switching element 234 allows exciting current to flow through the exciting winding 11 and turning off the switching element 234 allows exciting current to stop flowing through the exciting winding 11. The flywheel diode 235 is arranged in parallel to the exciting winding 11, thus making it possible that the exciting current kept to flow through the exciting winding 11 flows back as a flywheel current when the switching element 234 is switched off.

To detect the number of revolutions $N_{ALT}$ of the generator 1 witch is synchronous with the revolution of the engine, the determination circuit 24 is electrically connected to the armature windings 12 through a P-terminal, as shown in FIG. 1, and outputs the switching command signal to the switching circuit 223 arranged in the target value setting circuit 22. As described, the switching command signal indicates that the first target value, which has been given from the outside of the generator 1, should be used or not. Concretely, the determination circuit 24 is configured to operate on a comparative way. That is, the number of detected revolutions $N_{ALT}$ is compared with a reference revolution number. When this comparison reveals that the detected revolution number $N_{ALT}$ is lower than the reference revolution number, the switching command signal is set to a "low" level. In contrast, when it is determined that the detected revolution number $N_{ALT}$ is higher than or equal to the reference revolution number, the switching command signal is set to a "high" level. The reference revolution number is for example a value that is substantially equal to an idling revolution number of the engine.

In response to the switching command signal, the switching circuit 223 is activated in an on/off manner. If the switching command signal is in the "low" level, the internal connection in the switching circuit 223 switches over to the input terminal "a" to which the reference voltage Va (the first target value) is applied. In contrast, if the switching command signal is in the "high" level, the switching circuit 223 makes its internal connection switch to the input terminal "b" to which the reference voltage Vb (the second target value) is applied.

In the above configurations, the determination circuit 24 composes determination means and both of the target value setting circuit 22 and the voltage control circuit 23 compose output control means.

The generator 1 will now be described in terms of its operations and advantages in various situations.

(1) Normal Operations on Target Command Value from the External Controller:

(1a) In the Case of a Regulation Voltage of 14 Volts:

The target command value setting unit 32 in the external controller 3 provides a target command value in the form of information codes (i.e., command signal), which indicates a regulation voltage value (the value of voltage to regulated) of 14 V corresponding to a voltage obtained in the normal generation operations. In response to an output of the information codes indicative of such target command value towards the generator 1, the target value setting circuit 22 in the generation controller 2 makes the D/A converter 221 operate in such a manner that the information codes are converted to a reference voltage Va substantial equal to a regulation voltage of 14 V to be targeted. In cases where the revolution number of the generator 1 is lower than the predetermined reference revolution number, the switching command signal from the determination circuit 24 is a "low" level, so that the switching circuit 223 makes its input terminal "a" active. Thus the switching circuit 223 provides the reference voltage Va from its output terminal "c."

In the voltage control circuit 23, when the output voltage of the generator 1 exceeds the regulation voltage of 14 V so that the voltage Vd at the inverting input terminal of the voltage comparator 231 is larger than the reference voltage Vc (in this case, Va), the output signal from the comparator 231 transits from its high level to its low level. Responsively, the switching element 234 is turned off to decrease the amplitude of the exciting current passing the exciting winding 11, thereby lowing the output voltage of the generator 1.

By contrast, when the voltage Vd at the inverting input terminal of the voltage comparator 231 becomes lower than the reference voltage Vc (in this case, Va), the switching element 234 is again turned on to increase the exciting current passing the exciting winding 11, thereby increasing the output voltage of the generator 1.

In this way, the switching element 234 is controlled in the on/off fashion to control the amounts of the exiting current through the exciting winding 11. Accordingly, the output voltage of the generator 1 is regulated to converge to the regulation voltage of 14 V that has been specified as a target command value by the external controller 3.

In general, the output voltage from the generator 1 includes harmonic noises, such as ignition noise, ripples, commutation noise, and switching noise. Thus, the voltage comparator 231 is entitled to have functions of removing such noise components and giving a delay time to changes in input and output signals at the comparator 231. Thus the switching element 234 can be stabilized in its switching operations.

(1b) In the Case of a Regulation Voltage of 0 Volts:

When it is desired that the output current from the generator 1 is temporarily stopped, the value of voltage to be regulated (i.e., regulation voltage value) is changed from 14 V to 0 V temporarily, so that this stop operation is realized.

Specifically, the target command value setting unit 32 in the external controller 3 outputs a target command value indicating a regulation voltage of 0 V which is still categorized in the normal generating operations. In the target value setting circuit 22 in the generation controller 2, the D/A converter 22 converts the received information codes to a reference voltage Va corresponding to a regulation voltage of 0 V.

Because the battery 5 is connected to the output terminal of the generator 1, the voltage Vd at the inverting input terminal of the voltage comparator 231 is always higher than the reference voltage Va in this situation. Thus the output signal from the comparator 231 is kept at the "low" level, which causes the switching element 234 to be turned off to eliminate the exciting current. It is therefore possible to temporarily stop the supply of the output current from the generator 1.

(2) Operations Performed in Cases where Erroneous Target Commands Values are Transmitted from the External Controller:

(2a) In the Case of a Regulation Voltage of 0 V:

In the case that the external controller 3 continuously issues a target command value indicating the stop of generation, not temporarily, that is, there is an erroneous transmission of a target command value, the generator is obliged to sustain the generation-stopped state of the generator 1. If this erroneous transmission occurs, the generation controller 2 operates, as described hereinafter, to prevent drawbacks resultant from such transmission.

In response to the switching command signal from the determination circuit 24, the switching circuit 223 selects either the reference voltage Va or Vb. In other words, the revolution number of the generator 1 is lower than the predetermined reference revolution number, the switching command signal becomes low in level. Hence corresponding to the information codes which have been transmitted from the external controller 3, but which is erroneous one, the D/A converter 221 outputs, by its conversion, a reference voltage Va of 0 V. Thus the output signal from the voltage comparator 231 is forced to be a low level to turn off the switching element 234, stopping the generation of the generator 1.

On the other hand, if the revolution number of the generator 1 is greater than or equal to the reference revolution number, the level of the switching command signal from the determination circuit 24 becomes high. Hence the reference voltage Vb from the reference voltage generator 222 is selected by the switching circuit 223 for its output. By way of example, the reference voltage Vb is a value corresponding to the regulation voltage of 14 V, which is a voltage charging the battery (battery charge voltage) in the normal condition (with no erroneous transmission of the target command signal). By malting a comparison between the voltage Vd and this reference voltage Vb, the voltage comparator 231 changes its output signal at a low or high level in a controlled manner depending on the compared results. This makes is possible to control the output voltage of the generator 1 at 14 V to be targeted (i.e., the regulation voltage).

As described, when the vehicle runs at a speed that causes the generator 1 to rotate at a revolution number higher than or equal to the predetermined reference revolution number, the generation controller 2 prohibits the control of the generation based on target command values coining from the external controller 3. Instead, the battery charge voltage preset inside the controller 2 is used to control the generation. Therefore, in cases where the output voltage of the generator 1 decreases suddenly, the battery 5 and other electronic loads can be prevented from lowering largely in their performance.

(2b) In the Case of a Regulation Voltage Higher than or Equal to the Normal (Erroneous Transmission):

When a command signal indicative of a target command value for a regulation voltage (for example, 30 V) higher than the normal operation is transmitted from the external controller 3, the generation controller 2 is able to act to avoid the drawbacks resulting from such an erroneous command value.

When receiving such a higher target command value, the output signal from the voltage comparator 231 keeps its high level all the time. Hence, the generator 1 is brought into a continuously generated state due to the higher erroneous target command value (i.e., a non-controlled state. However, in this case, as long as a condition is kept in which the revolution number $N_{ALT}$ of the generator 1 is lower than the reference revolution number, an amount of generated power is sufficiently small, so that there is hardly influence on the battery or other electronic devices connected to the generator 1.

In this non-controlled state, however, the revolution number $N_{ALT}$ of the generator 1 becomes higher than or equal to the reference revolution number, the switching circuit 223 selects the reference voltage Vb (i.e., the normal target command value) from the reference voltage generator 222. This selection prevents the generation control based on the erroneous target command value from the external controller 3, thus stopping an excessive power supply. The battery 5 can therefore be prevented from an overcharge in a running condition of the vehicle, thereby preventing both of a deterioration in the battery performance resultant from the above erroneous target command value and an application of an excessive voltage to the electronic loads connected to the generator 1. A failsafe function is realized against the erroneously high command value.

Therefore, for the revolution number of the generator 1 higher than or equal to the reference revolution number, the control based on the target value (i.e., the first target value) on the command signal from the external controller 3 is prohibited. Instead, the target value to be set within the generation controller 2 is used to maintain the generated state. The transmission of erroneous command signals (i.e., erroneous target command values) from the external controller 3 does not largely influence the performances of the battery 5 and electronic loads connected to the generator 1.

The first target value is set to an amount (e.g., a voltage to be regulated of 0 V) that lowers the amount of generated power at the generator 1 less than that based on the second target value. Hence the amount of power generated in a range of lower running speeds can be suppressed. In addition, in the range of speeds more than the reference revolution number, the generation controller 2 is released from the above control to suppress the generated power, in which the second target value is used to control the generated state, with the overcharge at the battery 5 prevented.

Further, providing the reference revolution number with an amount almost equal to the number of revolutions during an idling state of an engine (an idling revolution number) makes it possible that the control of stopping the generation based on the first target value is prohibited as long as a vehicle is in a running condition. The battery 5 can therefore be prevented from being run out. Engine stall, which is a phenomenon that engine control devices are brought into a malfunction on account of a decrease in the terminal voltage of the battery 5, can be steadily prevented as well.

As a variation, the reference revolution number made reference in the determination circuit 24 may be set to an amount lower than the idling revolution number of an engine. This amount of revolution number is still useful for a case in which the number of revolutions of the engine causes a decrease during its idling operation. When such a decrease occurs, the generation control using target command values coming from the external controller 3 is permitted only during a period of time when the decrease continues. However, the target command value from the external controller 3 is zero or lower values. That is, depending on the target command values, the generator 1 generates no power or a little amount of power during such a period of time. Hence, by employing the structure based on this variation, it is possible to enable the engine to keep charging the battery during the idling operation, and if there is a decrease in the revolution number during the idling operation, the generation toque of the generator 1 is suppressed temporarily to prevent abnormal vibration or stall of the engine.

The present invention will not be limited to the configurations described in the above first embodiment and variations. Further various modifications are still possible within the gist of the present invention.

First of all, the first target value decided based on the command signal from the external controller 3 is given different values. In the first embodiment and variations, the first target value has been set to either a value to decrease an amount of power generated by the generator 1 than a power amount based on the reference voltage Vb (the second target value) produced within the generation controller 2 or a value to stop the generation at the generator 1. But this is not a definitive list.

For example, the first target value may be set to a value to increase the amount of power generated by the generator 1. Even when such a value to increase the generated power amount is given to the first target value, the number of revolutions of the generator 1 higher than or equal to the reference revolution number makes it possible that the generation control is performed based on the second target value generated within the generation controller 1, because the switching element 223 switches over to the "b" input terminal side. Hence the battery 5 can be protected from an overcharge and the electrical loads can be protected from an application of an excessive voltage.

This modification can be developed into a further configuration, in which the reference revolution number is set to an amount higher than the number of idling revolutions of the engine. By this setting, it is possible to prohibit the control increasing the generated amount in the running state using the first target value, and the second target value lower than the first one is used for the control. Hence the generator 1 stops supplying an excessive power during a period of time the number of revolutions is higher. The battery is therefore avoided from being overcharged during a vehicle's run so that a large deterioration in the performance of the battery can be avoided. In addition, the electrical loads are released from an excessive voltage application.

Further, in the above embodiment, the physical value that the command signal (information codes) from the external controller 3 indicates has been exemplified as being a target value of voltage to be regulated. However, the command signal may indicate an amount itself of exciting current to the exciting coil 11 and a duty ratio on which the exciting current is controlled in a switched on/off manner.

Moreover, the foregoing embodiment adopts the determination circuit 24 that receives the signal from one of the armature windings 12 in order to detect the number of revolutions $N_{ALT}$ of the generator 1 synchronous with the engine revolution. Instead, a sensor (not shown) to sense a signal indicative of the revolution may be arranged to the connection with the one of the armature windings 12.

Second Embodiment

Figure 2:
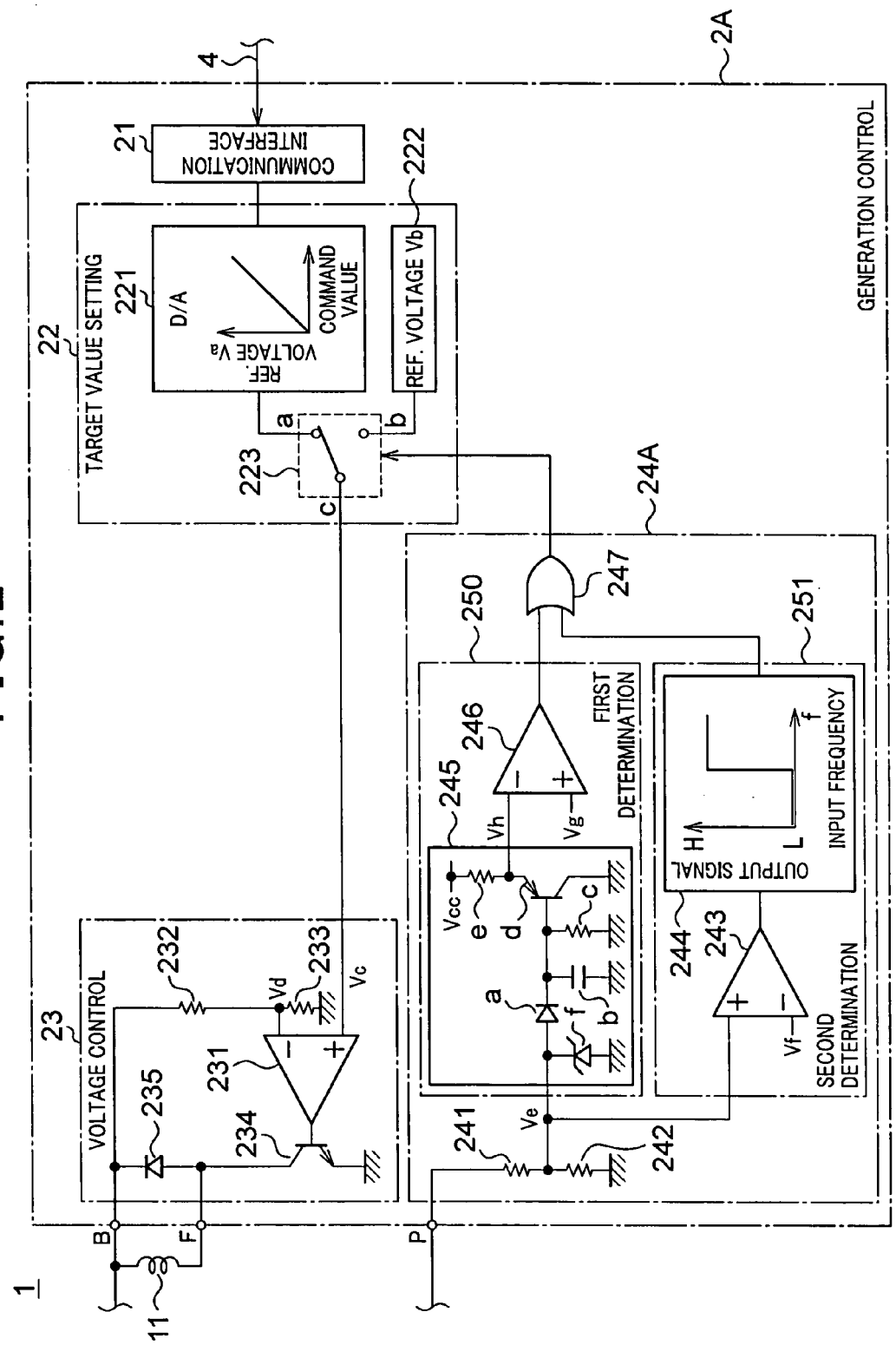
FIG. 2 is an electrical block diagram showing a generation controller according to a second embodiment of the present invention.

With reference to FIG. 2, a second embodiment of the generation controller according to the present invention will now be described.

In the second and successive embodiments, for the sake of simplified explanations, the components acting as the same or similar components to those in the fist embodiment will be given the same reference numerals.

The second embodiment intends to provide a further improved mode to the first embodiment. In other words, an improvement is given to processing based on the command signal from the external controller 3 when the command signal indicates a target value to stop the generation of the generator.

FIG. 2 shows a generation controller included in an on-vehicle generator 1 (simply, generator) according to the second embodiment. The generator 1 in this embodiment is formed such that the generation controller 2 shown in FIG. 1 is replaced by a new generation controller 2A shown in FIG. 2 and the determination circuit 24 in the generation controller 2 is replaced by a new determination circuit 24A.

As shown in FIG. 2, this new determination circuit 24A is equipped with resistors 241 and 242 composing a voltage divider; a voltage comparator 243 and a frequency determination circuit 244, which detect the frequency of voltage at a P-terminal (P-terminal voltage) connecting to one of the armature windings 11; a peak voltage detecting circuit 245 and a voltage comparator 246, which detect the amplitude of the P-terminal voltage; and an OR circuit 247.

The resistors 241 and 242 divide a rectangular-wave voltage detected at the P-terminal so as to produce a divided voltage Ve.

The voltage comparator 243 has an inverting (−) input terminal receiving a reference voltage Vf, a non-inverting (+) input terminal receiving the foregoing divided voltage Ve, and an output terminal outputting a signal to the frequency determination circuit 244. The combination of both the voltage divider using the resistors 241, 242 and the voltage comparator 243 applies wave-forming processing to the P-terminal voltage.

Thus the frequency determination circuit 244 receives the wave-formed P-terminal voltage to make a comparison between the frequency of the P-terminal voltage and a reference frequency corresponding to the reference revolution number for the generator 1. The frequency of the P-terminal voltage indicates the number of revolutions of the generator 1. The frequency determination circuit 244 produces, through its comparison, a low-level output signal when the frequency of the P-terminal voltage lower than the reference frequency is received. In contrast, concerning the frequency of the P-terminal voltage higher than or equal to the reference frequency, a high-level output signal is provided from the circuit 244. Both of the voltage comparator 243 and the frequency determination circuit 244 form a second determination circuit 251.

The peak voltage detecting circuit 245 has an input terminal connected to the voltage divider to receive the divided voltage Ve and an output terminal connected to an inverting input terminal of the voltage comparator 246. The detecting circuit 245 comprises a diode "a," a capacitor "b," resistors "c" and "e," a transistor "d," and a zener diode "f." An anode of the diode "a" is connected to the input terminal and a cathode thereof is connected to the capacitor "b," resistor "c" and a base of the transistor "d." The other terminals of the capacitor "b" and resistor "b" are grounded. An emitter of the transistor "d" is connected the power voltage line of voltage Vcc via the resistor "e," while a collector of the transistor "d" is connected to the ground. Further, from the connection between the resistor "e" and the emitter of the transistor "d," the output terminal of the circuit 245 is drawn out to provide an output voltage Vh. Both of the input voltage Ve and the output voltage Vh are set to be equal to each other. Incidentally the zener diode "f" is for protecting the cut 245 from excessive inputs.

The voltage comparator 246 has a non-inverting input terminal to receive a reference voltage Vg and an inverting input terminal to receive the output voltage Vh from the peak voltage detecting circuit 245. The reference voltage Vg is larger than the reference voltage Vf (Vg>Vf) given to the inverting input terminal of the voltage comparator 243. The peak voltage detecting circuit 245 and the voltage comparator 246 serves as a first determination circuit 250.

The OR circuit 247 is connected to receive both the output signals from the frequency determination circuit 244 and the voltage comparator 246 and to provide a switching command signal to the switching circuit 223 in the target value setting circuit 22. Like the first embodiment, the switching command signal indicates whether or not the first target value "Va" should be use for the generation control, i.e., the first target value is allowed to be used or prohibited from being used.

Therefore, like the switching processing in the first embodiment, in the switching circuit 223, when the switching command signal represents its low level, the internal connection is switched to the input terminal "a" side receiving the reference voltage Va (the first target value). On the other hand, when the switching command signal presents its high level, the internal connection is switched to the input terminal "b" side to which the reference voltage Vb (the second target value) is applied.

Of the above-described various components, the determination circuit 24A composes determination means and the target value setting circuit 22 and the voltage control circuit 23 compose output control means. The voltage comparator 246 is a first voltage comparator and the voltage comparator 243 is a second voltage comparator. The frequency determination circuit 244 corresponds to a circuit for comparing frequencies. The reference voltage Vg is a first reference voltage and the reference voltage Vf is a second reference voltage.

A description will now be made to an occasion in which the generator 1 is controlled to stop its output current (i.e. the stop of the generation) by the target command value setting circuit 32 of the external controller 3.

The stop of the generation includes both occasions for the normal control and the erroneous control described before. In the former one carried out as part of the normal generation control, the generation is ordered to stop by temporarily lowering the target value (i.e. a voltage value to be regulated) from the battery charge voltage to a voltage lower than that (for example, from 14 V to 10 V). The erroneous generation control is attributable to erroneous information codes (for example, a voltage value to be regulated is 0 V (i.e., a target value)), which is transmitted when the external controller 3 or other related devices are out of order.

(3a) Before Engine Start:

Before the generator 1 is driven to rotate by the engine, a rectangular-wave voltage (P-terminal voltage) will not appear at the P-terminal. Hence the input terminal Ve to the voltage comparator 243 is less than the reference voltage Vf, thus keeping the output signal of the comparator 243 at the low level. In response, the frequency determination circuit 244 determines that the frequency is lower, thus providing a low-level output signal therefrom. Concurrently, the peak voltage detecting circuit 245 and voltage comparator 246, which are placed to detect the amplitude of the P-terminal voltage, keeps the output signal from the voltage comparator 246 at the high level, because the input voltage Vh (=Ve) to the comparator 246 is less than the reference voltage Vg. Hence the OR circuit 247 operates to output the high-level In the target value setting circuit 22, responsively to the high-level switching command signal from the determination circuit 24A, the switching circuit 223 acts to select the reference voltage Vb produced by the reference voltage generator 222. For example, the reference voltage Vb is set to an amount corresponding to a regulation voltage 14 V serving as the battery charge voltage in the normal operations. Hence, in the voltage control circuit 23, the voltage comparator 231 is subjected to an input voltage condition of Vd<Vc(=Vb), which allows the comparator 231 to output a high-level signal. This activates the switching element 234 (i.e, "on"), whereby the exciting winding 11 is subjected to flow of initial exciting currents.

(3b) After Engine Start:

With the exciting currents flowing, once the engine is started to be driven, the rotation of the rotor allows the armature windings 12 to induce electromotive force thereon to provide voltage at the P-terminal. When the amplitude Vh of this P-terminal voltage is larger than the reference voltage Vg (for example, a voltage value corresponding to a P-terminal voltage of 8 V; Vh>Vg), the output signal from the voltage comparator 246 changes to the low-level signal. Because the two input signals to the OR circuit 247 are low level, the output signal therefrom becomes low in level.

Accordingly, in the target value setting circuit 22, the switching circuit 223 selects the reference voltage Va in response to the low-level switching command signal. This means that, in cases where the vehicle is idling, the reference voltage Va produce by the D/A converter 221 corresponds to a regulation voltage of 0 V indicated by the command signal. The voltage comparator 231 in the voltage control circuit 23 has the input voltage Vd larger than the reference voltage Vc (=Va), thus providing a low-level output signal therefrom. This signal causes the switching element 234 to be switched off, thus stopping the exciting current flowing through the excitation windings 11. Thus the P-terminal voltage decreases in the amplitude.

Repeating this way of control makes it possible to control the P-terminal voltage in such a manner that the internal generation is still sustained, but the output current from the generator 1 is not outputted outside thereof.

As described above, the reference voltage Vg (e.g., a voltage corresponding to a P-terminal voltage of 8 V) to distinguish the amplitude of the P-terminal voltage is kept higher than or equal to the reference voltage Vf (e.g., a voltage corresponding to a P-terminal voltage of 5 V) for detecting the frequency of the P-terminal voltage (Vg>Vf). Using this way of setting manner, even when the generation stop is commanded from the external controller 3, the frequency component of the P-terminal voltage can be detected, because, in this state, the peak voltage of the P-terminal voltage is still higher than the voltage level for frequency thereof.

When the vehicle starts its running and the revolution number of the generator 1 becomes higher than or equal to the reference revolution number, the frequency determination circuit 244 determines that the frequency of the P-terminal voltage is higher than or equal to the reference frequency corresponding to the reference rotation number, thus providing a high-level output signal. Hence the OR circuit 247 outputs a high-level signal.

In the target value setting circuit 22, in response to the high-level switching command signal, the reference voltage Vb (e.g., corresponding to a target voltage of 14 V serving as the battery charge voltage in the normal conditions) is outputted from the switching circuit 223. Thus, the voltage comparator 231 compares the input voltage Vd with this reference voltage Vb, resulting in controlling the output voltage of the generator 1 at the desired regulation voltage of 14 V.

In this way, in the case that the command signal from the external controller 3 shows a voltage to be regulated (a target voltage value) lower than the battery charge voltage but there is no voltage at the P-terminal, the generation control can be done. That is, in such cases, the generation control based on the command signal from the external controller 3 is prohibited, but the battery charge voltage produced in the generation controller 2A is used for the generation control. The initial exciting current can be made to flow through the exciting winding 11 in a steady manner, whereby the generation is started easily with no disturbance in the rotated states of the generator itself.

When the engine is started, the generation control is made to keep the internal generation with no output current from the generator. There is no influence on the start control even when the external controller 3 issues a command signal to stop the generation.

Additionally, even when the stop of the generation is commanded by the external controller 3 after the engine start, the peak value of the P-terminal voltage is kept higher than a voltage level for detecting the frequency of the P-terminal voltage at a time when the generation has just started. With this voltage level relationship, the reference voltage Vg for determining the amplitude of the P-terminal voltage is set to a level than or equal to the reference voltage Vf for detecting the frequency component of the P-terminal voltage. The frequency of the P-terminal voltage is continuously detectable, with the result that the number of revolutions of the generator 1 can be detected with steadiness.

On the other hand, when the vehicle is in a running condition and the external controller 3 continuously issues a command signal indicating a voltage to be regulated (i.e., a target voltage) lower than the voltage to charge the battery 5, the generation control can be done internally. This control still keeps the peak value of the P-terminal voltage, with the frequency thereof determined. Thus, when the number of revolutions of the generator 1 becomes higher than or equal to the reference one, the generation control can be shifted to the control which is based on the internally set second target value Vb (i.e., the battery charge voltage) by the generator itself.

As described so far, the configurations in the second embodiment are able to cope with the generation and the control thereof with steadiness, which provides more improved functions than the first embodiment. That is, in the case where the command of a target value less than the battery charge voltage is continuously commanded when the engine has just been started, the exciting current can be secured to start the generation itself. Namely, a drawback, which is caused in the above case when there are no configurations described in the second embodiment, that no exciting current flows, though the generator 1 rotates, can be eliminated.

What's more, in the case where the command of a target value less than the battery charge voltage is continuously commanded during a running operation of the vehicle, the generation control can be shifted smoothly to the control which is based on the internally set reference revolution number Vb at a time when the actual revolution number exceeds the reference one. In other words, a drawback, which is caused in the above case when there are no configurations described in the second embodiment, that there is no voltage on the P-terminal due to no exciting current can be eliminated.

Third Embodiment

Figure 3:
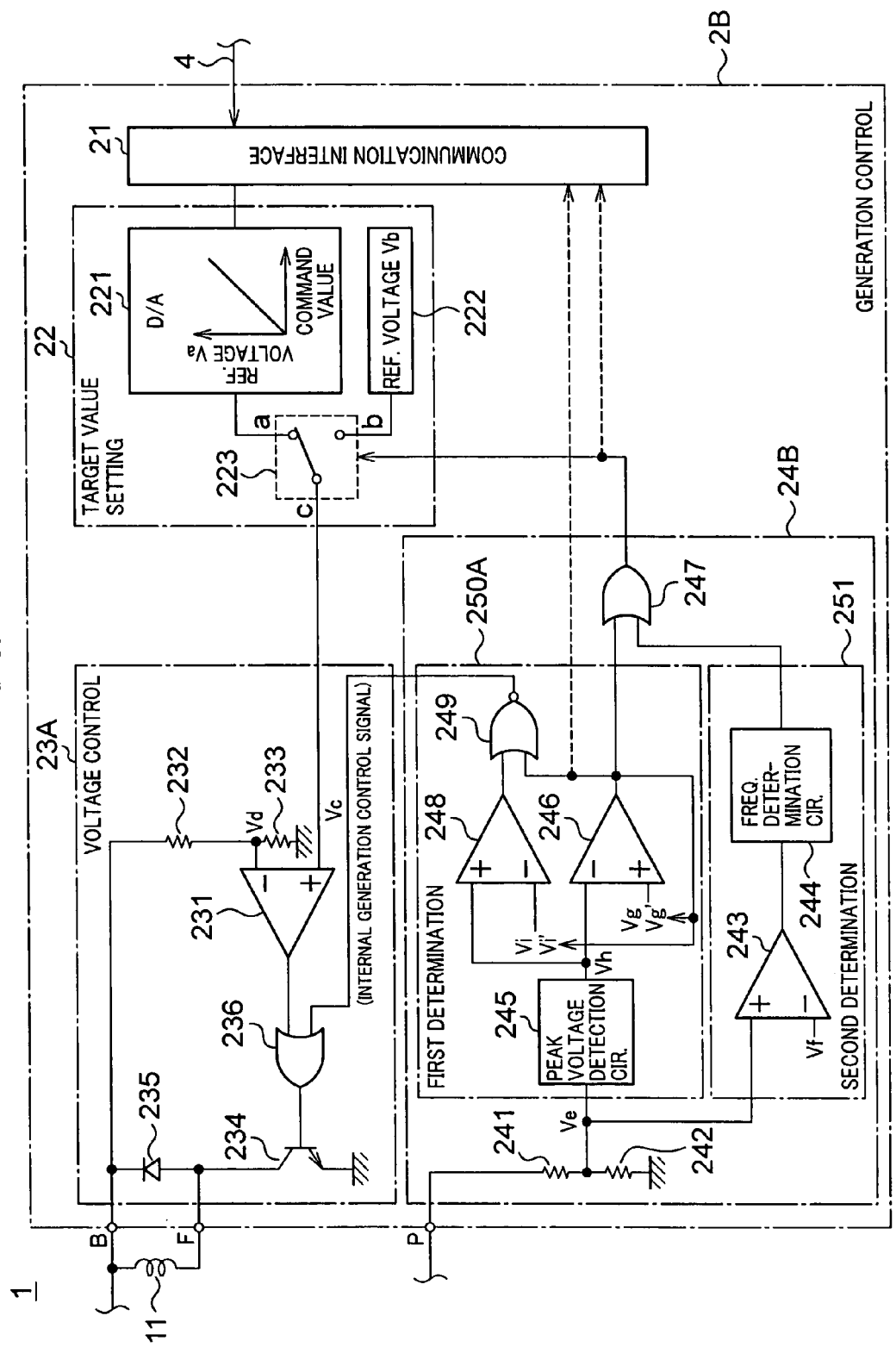
FIG. 3 is an electrical block diagram showing a generation controller according to a second embodiment of the present invention.

With reference to FIG. 3, a third embodiment of the generation controller according to the present invention will now be described.

The third embodiment intends to provide a further improved mode of the second embodiment. That is, an improvement is given to the condition where the generation control is shifted to the control based on the internally set second target value Vb with the first target value Va higher than the second one Vb.

FIG. 3 shows a generation controller included in an on-vehicle generator (simply, generator) according to the third embodiment. The generator shown in FIG. 3 comprises a generation controller 2B, in which the voltage control circuit 23 in the generation controller 2A shown in FIG. 2 is replaced by a voltage control circuit 23A. Like this, the determination circuit 24A shown in FIG. 2 is replaced by a determination circuit 24B.

To be specific, the determination circuit 24B includes additional circuits to the determination circuit 24A shown in FIG. 2. That is, a voltage comparator 248 and a NOR circuit 249 are added. Both of the voltage comparators 246 and 248 have hysteresis characteristics, respectively. Meanwhile, in the voltage control circuit 23A, an OR circuit 236 is added.

Of the additional components, the voltage comparator 248 composes a third voltage comparator, which receives two reference voltages Vi and Vi' serving as a third reference voltage. As will be described later, a signal outputted from the NOR circuit 249 to the voltage control circuit 23A composes an internal generation control signal.

The operations of the generator controller 2B according to the third embodiment will now be descried.

The operations carried out before the engine start are the same as those of the generation controller 2A shown in FIG. 2B, so the description herein will focus on the operations carried out after the engine start.

When the engine starts to rotate its rotor, electromotive forces are induced across each armature winding 12, whereby a voltage appears at the P-terminal. On meeting a condition in which the amplitude Vh of this P-terminal voltage is larger than the reference voltage Vg (Vh>Vg), the output signal from the voltage comparator 246 becomes low in level. The reference voltage Vg is, for example, an amount corresponding to a P-terminal voltage of 10 V). Hence the two input signals to the OR circuit 247 both are low level, so that the output signal therefrom is also low level.

In the target value setting circuit 22, depending on the switching command signal from the determination circuit 24B, the D/A converter 221 produces a reference voltage Va (the first target value) corresponding to a regulation voltage of 0 V from the received information codes. In this case, an assumption is made such that the command from the external controller 3 is for the reference voltage Va corresponding to such a regulation voltage of 0 V in order to allow the generator 1 to perform the generation with no revolution torque, which is setting for starting the engine.

Applied to the non-inverting input terminal of the voltage comparator 246 is a reference voltage Vg' after undergoing the hysteresis (e.g., a voltage corresponding to a P-terminal voltage of 6 V). In contrast, an inverting input terminal of the added voltage comparator 246 receives a hysteresis-processed reference voltage Vi' (e.g., a voltage corresponding to a P-teal voltage of 8 V).

To the voltage comparator 231 of the voltage control circuit 23A, applied to the inverting input terminal is an input voltage Vd higher than or equal to the reference voltage Vc (=Va) to be applied to the non-inverting input terminal. Thus the comparator 231 outputs a low-level signal to switch off the switching element 234. This eliminates the exciting current flowing through the exciting winding 11, so that the P-terminal voltage is decreased in amplitude.

When the amplitude Vh of the P-terminal voltage decreases down to a value less than the reference voltage Vi' (corresponding to 8 V at the P-terminal, in the present embodiment), the output signal of the voltage comparator 248 transits to a low-level signal. Responsively, the two input signals to the NOR circuit 249 both are low level, which, in turn, the output signal therefrom becomes high in level. The output of the OR circuit 236 thus becomes high in level, resulting in switching on the switching element 234. Since an exciting current begins flowing through the exciting winding 11, the voltage at the P-terminal increases.

When the amplitude Vh of the voltage at the P-terminal increases more than the reference voltage Vi', so that the output signal from the voltage comparator 248 becomes high in level. Thus, the output signal from the NOR circuit 249 becomes a low-level signal. By repeating this cycle of operations, the amplitude of voltage at the P-terminal can be controlled to sustain the internal generation which does not provide the output current of the generator 1 outside thereof.

Now an assumption can be made such that the vehicle have started running and the battery 5 is charged under a regulation voltage of 15 V (i.e., a command value) commanded by the external controller 3. In this condition, the amplitude Vh of voltage at the P-terminal is higher than or equal to the reference voltage Vi' corresponding to a voltage of 8 V at the P-terminal, the output signal of the voltage comparator 248 rises up to its high level and, in contrast, the output signal of the NOR circuit 249 is lowered down to its low level.

In this running condition, assume that the number of revolutions of the rotor of the generator 1 is higher than or equal to the reference one. When such a condition is met, the reference voltage Vb (corresponding to, for example, a regulation voltage of 14 V preset as the battery charge voltage in the normal conditions) is outputted via the switching circuit 223, in response to the high-level switching command signal outputted from the OR circuit 247 in the determination circuit 24B.

This gives two low-level input signals to the OR circuit 236, which enables the OR circuit 236 to output a low-level signal, thereby switching off the switching element 234. Hence the exciting current stops from flowing through the exciting winding 11, and then the voltage at the P-terminal decreases. The decrease in the P-terminal voltage makes the output signal of the voltage comparator 248 decrease down to its low level.

However, because the P-terminal voltage is still higher than or equal to the reference voltage Vg' (corresponding to a voltage of 6V at the P-terminal), the voltage comparator 246 keeps the output signal at its low level. This allows the two input signals to the NOR circuit 249 to be low in level, so that the output signal of the NOR circuit 249 becomes high in level. As a result, the output signal from the OR circuit 236 is high-level enough to switch on the switching element 234, thus the exciting current flowing, thus causing an increase in the P-terminal voltage.

When this increase creates a situation where the amplitude Vh of the P-terminal voltage is higher than or equal to the reference voltage Vi', the output signal of the voltage comparator 248 is high-level and the output signal of the NOR circuit 249 is low-level. By repeating such operations, the P-terminal voltage is controlled in the amplitude so that the internal generation is kept not to supply the output current outside the generator 1.

Then, the output signal of the voltage comparator 231 becomes high in level, if the input voltage Vd at the inverting terminal of the comparator 231 decreases below the reference voltage Vc (=Vb) (Vd<Vc), the output signal of the comparator 231 is switched to its high level. Accordingly, the output of the OR circuit 236 becomes high in level, so that the switching element 234 is switched on. The exciting current thus flows through the exciting winding 11, and the generation is controlled such that the output of the generator 1 is regulated at a target voltage commanded.

As described, the reference voltage Vi' (corresponding to a voltage of 8 V at the P-terminal), which is set to determine the amplitude of the P-terminal voltage, is set to an amount higher than or equal to the is reference voltage Vf (corresponding to a voltage of 5 V at the P-terminal) for determining the frequency of the P-terminal voltage. Thus the P-terminal voltage is kept to a value for performing the internal generation, regardless of the contents of the signal to control the regulated voltage (i.e., the output signal of the voltage comparator 231). Thus it is possible to detect the frequency of the P-terminal voltage, with the frequency thereof still sustained. Erroneous operations in determining the number of revolutions of the generator 1 can therefore be prevented.

A modification of the generation controller 2B described in the third embodiment can be provided as follows. As shown in FIG. 3, the output terminal of the voltage comparator 246 is connected to the communication interface 21 to transmit the output signal of the comparator 246 towards the external controller 3 via the communication interface 21. In response to a rise in the P-terminal voltage over the reference voltage Vg, the output signal of the comparator 246 promptly transits from its high level to its low level. Hence, utilizing this level transition, the external controller 3 can notify of whether or not the generator has been driven to generate power normally via the communication interface 21. For example, in the case that the connection to the P-terminal has been disconnected to disable the detection of voltage at the P-terminal, the voltage comparator 246 is obliged to keep outputting the high-level signal. This continuous signal output state can be transmitted to the external controller 3 to show that the detection line from the P-terminal has a malfunction and to allow the external controller 3 to issue a warning to users. This warning will inform users that the generation control from the outside is prohibited.

In response to the high-level switching command signal from the OR circuit 247 in the determination circuit 24B, the reference voltage Vb produced by the reference voltage generator 222 is provided through the switching circuit 223. Since the NOR circuit 249 outputs the low-level signal, the output signal form the voltage comparator 231 controls the output of the generator 1 so that the output voltage will comply with the internally set reference voltage Vb (e.g., a voltage of 14 V to be regulated), independently of the command values indicated by the command signal from the external controller 3.

As a result, even if there occurs a malfunction along the detection line connecting to the determination circuit 2413, the warning informing the malfunction can be issued by the generator itself, while still maintaining the generation for fail safe. Further, the external controller 3 is also able to recognize whether the generation control based on an external command is permitted or not A further modification can be provided such that the output terminal of the OR circuit 247 (equivalent to the respective output terminals of the voltage comparator 246 and the frequency determination circuit 251) is connected to the communication interface 21. The output signal from the OR circuit 247 can therefore be transmitted to the external controller 3 via the communication interface 21. With this connection, the external controller 3 is able to know the generation control based on the external command signal is still permitted or not through appropriate monitoring and processing of the acquired signal.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A generation controller for controlling an amount of power generated by an on-vehicle generator in response to a command signal transmitted from an external controller placed outside the generator, the generation controller comprising;
   a detection unit detecting a revolution number of the generator;
   a determination unit determining whether or not the revolution number of the generator is over a reference revolution number; and
   an output control unit controlling an output of the generator based on a first target value decided corresponding to a command value indicated by the command signal, in cases where the revolution number of the generator is less than the reference revolution number, and controlling the output of the generator based on a second target value in place of the first target value, the second target value being set internally within the generation controller, in cases where the revolution number of the generator is over or equal to the reference revolution number.

2. The generation controller according to claim 1, wherein the first target value is a value to allow the amount of power generated by the generator to be less than an amount of power generated by the generator based on the second target value.

3. The generation controller according to claim 1, wherein the reference revolution number is substantially equal to an idling revolution number of an engine to drive the generator.

4. The generation controller according to claim 1, wherein the reference revolution number is set to an amount smaller than an idling revolution number of an engine to drive the generator.

5. The generation controller according to claim 1, wherein the first target value is a value to allow the amount of power generated by the generator to be higher than an amount of power generated by the generator based on the second target value.

6. The generation controller according to claim 5, wherein the reference revolution number is set to an amount higher than an idling revolution number of an engine to drive the generator.

7. The generation controller according to claim 1, wherein the second target value is a value substantially equal to a voltage charging a battery connected to the generator.

8. The generation controller according to claim 2, wherein the second target value is a value substantially equal to a voltage charging a battery connected to the generator.

9. The generation controller according to claim 3, wherein the second target value is a value substantially equal to a voltage charging a battery connected to the generator.

10. The generation controller according to claim 4, wherein the second target value is a value substantially equal to a voltage charging a battery connected to the generator.

11. The generation controller according to claim 5, wherein the second target value is a value substantially equal to a voltage charging a battery connected to the generator.

12. The generation controller according to claim 6, wherein the second target value is a value substantially equal to a voltage charging a battery connected to the generator.

13. A generation controller for controlling an amount of power generated by an on-vehicle generator in response to a command signal from an external controller placed outside the generator, the generation controller comprising:
   a detection unit detecting a revolution number of the generator;
   a determination unit determining whether or not the revolution number of the generator is within a predetermined range of revolution numbers, and
   an output control unit controlling an output of the generator based on a first target value decided corresponding to a command value indicated by the command signal, in cases where the revolution number of the generator is within the predetermined range of revolution numbers and controlling the output of the generator based on a second target value in place of the first target value, the second target value being set internally within the generation controller, in cases where the revolution is number of the generator is outside the predetermined range of revolution numbers.

14. The generation controller according to claim 13, wherein the second target value is a value substantially equal to a voltage charging a battery connected to the generator.

15. The generation controller according to claim 14, wherein the determination unit comprises
a first determination circuit determining a difference between a lower limit of the predetermined range of revolution numbers and the revolution number of the generator using an amplitude of a phase voltage induced across an armature winding of the generator,
wherein the first determination circuit comprises
a detection circuit detecting, as the amplitude, a peak value of the phase voltage, and
a first voltage comparator determining whether or not the peak value is lower than a first reference voltage lower than the voltage charging the battery, and producing a switching signal for commanding the control of the output of the generator carried out based on the second target value, in cases where it is determined that the peak value is lower than the first reference voltage, and for commanding the control of the output of the generator carried out based on the first target value, in cases where it is determined that the peak value is higher than or equal to the first reference voltage.

16. The generation controller according to claim 15, wherein the output control unit comprises regulation means for regulating the output of the generator so that the peak value of the phase voltage is kept at the first reference voltage, when the first target value is set to an amount lower than the voltage charging the battery.

17. The generation controller according to claim 15, wherein the determination unit comprises a second determination circuit determining a difference between an upper limit of the predetermined range of revolution numbers and the revolution number of the generator on the basis of a frequency of the phase voltage,
wherein the second determination circuit comprises
a second voltage comparator making a comparison between the phase voltage and a second reference voltage designated as an amount less than the first reference voltage; and
a frequency comparator determining, based on compared results at the second voltage comparator, whether or not the frequency of the phase voltage is smaller than a reference frequency, and producing the switching signal for commanding the control of the output of the generator carried out based on the first target value, in cases where it is determined that the frequency of the phase voltage is lower than the reference frequency, and for commanding the control of the output of the generator carried out based on the second target value, in cases where it is determined that the frequency of the phase voltage is higher than or equal to the reference frequency.

18. The generation controller according to claim 16, wherein the determination unit comprises a second determination circuit determining a difference between an upper limit of the predetermined range of revolution numbers and the revolution number of the generator on the basis of a frequency of the phase voltage,
wherein the second determination circuit comprises
a second voltage comparator making a comparison between the phase voltage and a second reference voltage designated as an amount less than the first reference voltage; and
a frequency comparator determining, based on compared results at the second voltage comparator, whether or not the frequency of the phase voltage is smaller than a reference frequency, and producing the switching signal for commanding the control of the output of the generator carried out based on the first target value, in cases where it is determined that the frequency of the phase voltage is lower than the reference frequency, and for commanding the control of the output of the generator carried out based on the second target value, in cases where it is determined that the frequency of the phase voltage is higher than or equal to the reference frequency.

19. The generation controller according to claim 17, wherein the determination unit comprises
a third voltage comparator comparing the peak value of the phase voltage with a third reference voltage higher than the first reference voltage but lower than the voltage charging the battery, and
means for outputting to the output control unit an internal generation control signal on the basis of compared results at the first and third voltage comparators, the internal generation control signal being set to shut off an exciting current flowing through an exciting winding of the generator, in cases where the peak value is higher than or equal to the third reference voltage, and to allow the exciting current to flow through the exciting winding, in cases where the peak value is higher than or equal to the first reference voltage but lower than the third reference voltage.

20. The generation controller according to claim 19, comprising means for transmitting at least one of the switching signal from the determination unit and the switching signal from the first determination circuit towards the external controller.

* * * * *